US006718632B2

(12) United States Patent
Liu et al.

(10) Patent No.: US 6,718,632 B2
(45) Date of Patent: Apr. 13, 2004

(54) METHOD OF MAKING A FLUID-JET EJECTION DEVICE

(75) Inventors: Qin Liu, Corvallis, OR (US); Naoto Kawamura, Corvallis, OR (US); Chien-Hua Chen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/208,331

(22) Filed: Jul. 29, 2002

(65) Prior Publication Data

US 2002/0191054 A1 Dec. 19, 2002

Related U.S. Application Data

(62) Division of application No. 09/774,259, filed on Jan. 29, 2001, now Pat. No. 6,481,832.

(51) Int. Cl.[7] .................................................. B23P 17/00

(52) U.S. Cl. .......................... 29/890.1; 29/592; 29/612; 29/809.09; 216/27; 216/41; 347/44; 347/63

(58) Field of Search ........................... 29/408, 611, 620, 29/592 R, 890.09, 890.1; 216/27, 37, 39, 41, 49, 52, 56, 79, 99; 347/20, 44, 47, 54, 56, 63, 65, 67; 430/329

(56) References Cited

U.S. PATENT DOCUMENTS

| | | | | | |
|---|---|---|---|---|---|
| 4,789,425 A | | 12/1988 | Drake et al. | | |
| 4,864,329 A | | 9/1989 | Kneezel et al. | | |
| 5,201,987 A | * | 4/1993 | Hawkins et al. | .............. | 347/65 |
| 5,322,594 A | * | 6/1994 | Bol | ............................ | 216/27 |
| 5,458,254 A | * | 10/1995 | Miyagawa et al. | ........... | 216/27 |
| 6,139,761 A | * | 10/2000 | Ohkuma | ...................... | 216/27 |
| 6,162,589 A | * | 12/2000 | Chen et al. | ................. | 430/320 |
| 6,164,762 A | | 12/2000 | Sullivan et al. | | |
| 6,209,993 B1 | * | 4/2001 | Wang et al. | .................. | 347/65 |
| 6,241,906 B1 | * | 6/2001 | Silverbrook | ................. | 216/27 |
| 6,273,557 B1 | * | 8/2001 | Milligan et al. | .............. | 347/65 |
| 6,419,346 B1 | | 7/2002 | Nikkel | | |
| 6,473,966 B1 | * | 11/2002 | Kohno et al. | .............. | 29/890.1 |

FOREIGN PATENT DOCUMENTS

| | | |
|---|---|---|
| EP | 0244214 A1 | 11/1987 |
| EP | 0841167 A2 | 5/1988 |

* cited by examiner

*Primary Examiner*—Peter Vo
*Assistant Examiner*—Donghai D. Nguyen
(74) *Attorney, Agent, or Firm*—Timothy F. Myers

(57) ABSTRACT

A method of creating a fluid ejection device is described. The fluid ejection device has a substrate having a set of thin-film layers disposed on a first surface. A photoresist is applied on the set of thin-film layers, the photoresist has openings defined therein. The set of thin-film layers and substrate in the openings are etched to create deep slots beneath the first surface of the substrate. The photoresist is removed. A protection layer is applied over the set of thin-film layers thereby filling the deep slots in the set of thin-film layers and substrate. A feed channel is created on a second surface of the substrate until the protection layer within the deep slots is exposed. The protection layer is then removed.

7 Claims, 11 Drawing Sheets

—PRIOR ART—

METHOD OF MAKING A FLUID-JET EJECTION DEVICE

This application is a divisional of application Ser. No. 09/774,259 filed on Jan. 29, 2001, now U.S. Pat. No. 6,481,832, which is hereby incorporated by reference herein.

FIELD OF THE INVENTION

The invention relates to the manufacture of fluid ejection devices, more specifically, the invention relates to fluid ejection devices used in fluid ejection cartridges and fluid delivery devices such as printers.

BACKGROUND OF THE INVENTION

One type of fluid-jet printing system uses a piezoelectric transducer to produce a pressure pulse that expels a droplet of fluid from a nozzle. A second type of fluid-jet printing system uses thermal energy to produce a vapor bubble in a fluid-filled chamber that expels a droplet of fluid. The second type is referred to as thermal fluid-jet or bubble jet printing systems.

Conventional thermal fluid-jet printers include a print cartridge in which small droplets of fluid are formed and ejected towards a printing medium. Such print cartridges include fluid-jet printheads with orifice structures having very small nozzles through which the fluid droplets are ejected. Adjacent to the nozzles inside the fluid-jet printhead are fluid chambers, where fluid is stored prior to ejection. Fluid is delivered to fluid chambers through fluid channels that are in fluid communication with a fluid supply. The fluid supply may be, for example, contained in a reservoir part of the print cartridge.

Ejection of a fluid droplet, such as ink, through an orifice opening (nozzle) may be accomplished by transferring energy to a volume of fluid within the adjacent fluid chamber, such as with heat or mechanical energy. For example, the transfer of heat causes a rapid expansion of vapor in the fluid. The rapid expansion of fluid vapor forces a drop of fluid through the nozzle in the orifice structure. This process is commonly known as “firing.” The fluid in the chamber may be heated with a transducer, such as a resistor, that is disposed and aligned adjacent to the nozzle.

The printhead substructure is overlaid with at least one orifice layer. Preferably, the at least one orifice layer is etched to define the shape of the desired firing fluid chamber within the at least one orifice layer. The fluid chamber is situated above, and aligned with, the resistor. The at least one orifice layer is preferably formed with a polymer coating or optionally made of an fluid barrier layer and an orifice plate. Other methods of forming the orifice layer(s) are know to those skilled in the art.

In direct drive thermal fluid-jet printer designs, the thin-film device is selectively driven by electronics preferably integrated within the integrated circuit part of the printhead substructure. The integrated circuit conducts electrical signals directly from the printer microprocessor to the resistor through conductive layers. The resistor increases in temperature and creates super-heated fluid bubbles for ejection of the fluid from the fluid chamber through the nozzle. To prevent the resistor from overheating and causing premature ejection of fluid from the fluid chamber, the fluidic structure must be designed to both transfer heat efficiently to the fluid in the fluid chamber during firing and after firing, to transfer excess residual heat into the printhead and fluid not in the fluid chamber to allow the resistor to cool sufficiently before firing reoccurs. As the firing frequency increases, the heat transfer characteristic of the fluidic design becomes critical in avoiding thermal build-up to provide consistent bubble nucleation.

It is desirous to fabricate a fluid-jet printhead capable of producing fluid droplets having consistent and reliable drop shapes and weights to maintain print quality.

SUMMARY

The invention is a fluid ejection device, such as a printhead, that has a substrate with a first surface mating to an orifice layer, preferably through a stack of thin-film layers. The orifice layer defines a fluid chamber interfacing to an orifice opening or nozzle. The substrate has a second surface having a truncated pyramidal structure; either polyhedral or triangular ridge shaped defining an opening through the substrate to the fluid chamber. The substrate further has an ejection element, preferably disposed as a resistor in the stack of thin-film layers. When energy is transferred from the ejection element to the fluid in the fluid chamber, fluid is ejected from the orifice opening. The fluid ejection device may have one or a plurality of fluid chambers and one or a plurality of frustums of a truncated polyhedral, truncated pyramidal, truncated conical or truncated triangular cross-sectional ridge structures defining openings from the second surface of the substrate to the fluid chambers.

DETAILED DESCRIPTION OF THE PREFERRED AND ALTERNATE EMBODIMENTS

Figure 1A:
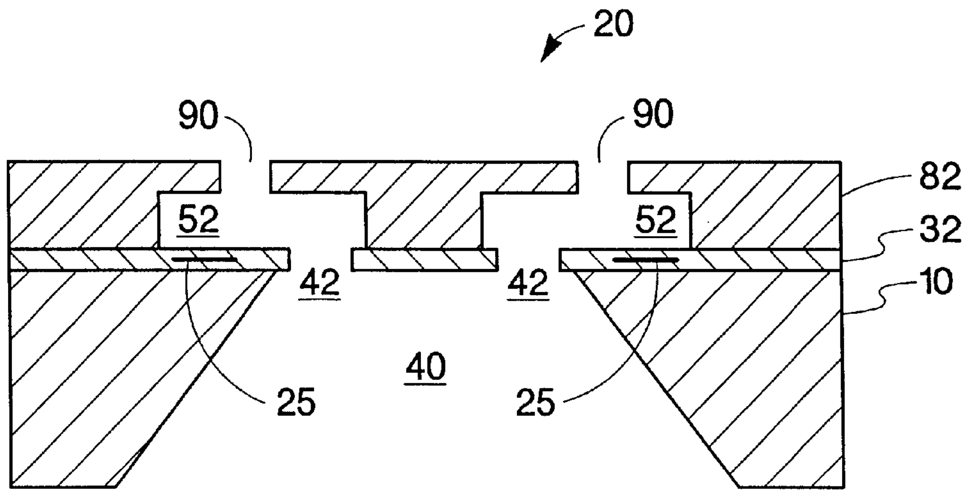
FIG. 1A is a cross-sectional view of a conventional printhead.

FIG. 1A is a cross-sectional view of a conventional fluid-jet printhead 20. Fluid flows from the fluid channel 40 formed in substrate 10 through fluid feed slots 42 into the fluid chamber 52. Ejection element 25, typically a resistor, piezoelectric element, or electro-strictive device, transfers energy either through heat or mechanical energy to the fluid in fluid chamber 52. The ejection element 25 is preferably formed in a stack of thin-film layers 32 as a resistor. Applied and disposed on the stack of thin-film layers 32 is an orifice layer 82 which is made up of one or more separate layers to create the fluid chamber 52 and orifice opening 90. When energy is transferred to the fluid in fluid chamber 52, a bubble of vapor forms causing fluid to eject from orifice opening 90. As ejection element 25 is disposed over the substrate 10, residual heat is transferred to the substrate 10 through thermal coupling. Also a portion of the residual heat transferred to the substrate is further transferred to the fluid in fluid channel 40 through the surface of the fluid channel 40.

Although a printhead may have 300 or more orifice openings 90 and associated fluid chambers 52, detail of a single fluid ejection chamber is sufficient for one to understand the invention. It should also be understood by those skilled in the art that many printheads are formed on a single substrate 10 and then separated from one another using conventional techniques. Preferably, the substrate 10 is made of silicon (Si) with a crystalline orientation of <100> and is approximately 675 microns thick. When forming the fluid channel 40 of FIG. 1, it is difficult to perfectly align the backside channel mask with the fluid feed holes 42.

One aspect of the invention is to allow for this misalignment by not requiring a complete backside trench etch to the stack of thin-film layers 32 surface. Another aspect of the invention is to increase the surface area of the substrate 10 contacting fluid in the fluid channel, thereby increasing the rate of residual heat transfer from ejection element 25 to the substrate 10 and the fluid. Another aspect of the invention is that by leaving a portion of the substrate 10 beneath the stack of thin-film layers 32, buckling and warping of the stack of thin-film layers 32 in the fluid chamber is reduced.

Figure 1B:
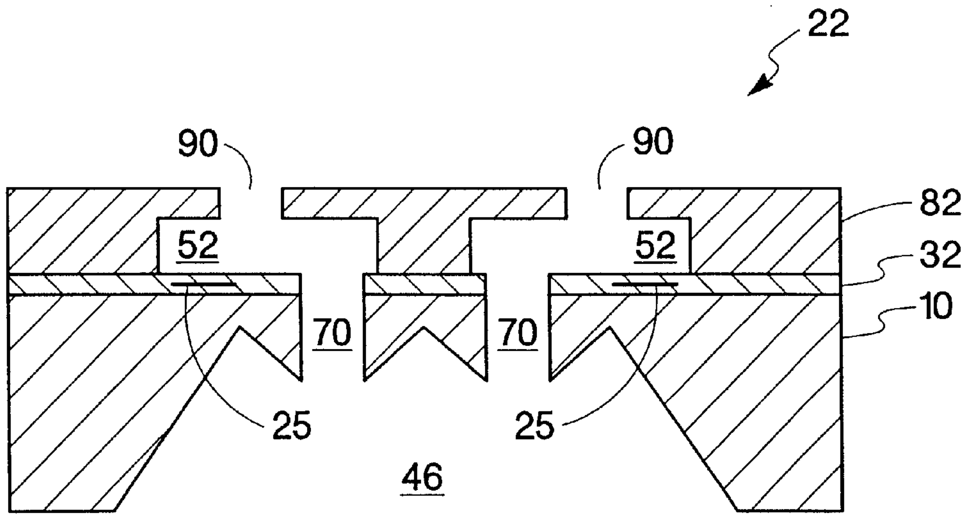
FIG. 1B is a cross-sectional view of a printhead incorporating the invention.

FIG. 1B is an exemplary cross section of a fluid ejection device, a printhead 22, that incorporates the invention. The substrate 10 has a fluid channel 46 that has a serrated edge cross-section. Processing the substrate 10 by one set of the optional method steps of the invention forms this feature. Fluid within fluid channel 46 flows into fluid chambers 52 formed in orifice layer 82 through fluid feed slots 70. Fluid is ejected from the printhead 22 using ejection element 25 to supply energy to the fluid in fluid chamber 52 such that a vapor bubble is formed. The formed vapor bubble causes fluid to be ejected out of orifice opening 90, which is also formed in orifice layer 82.

Figure 2:
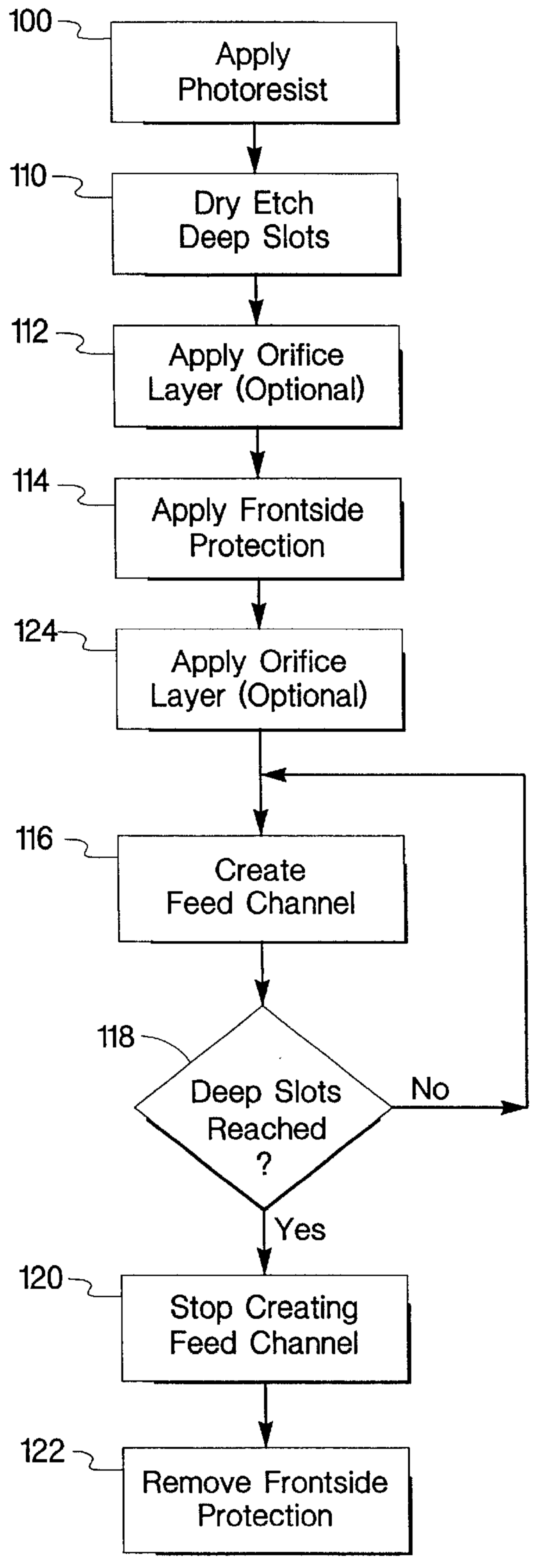
FIG. 2 is flow chart of an exemplary process used to create the improved printhead of the invention.
Figure 3A:
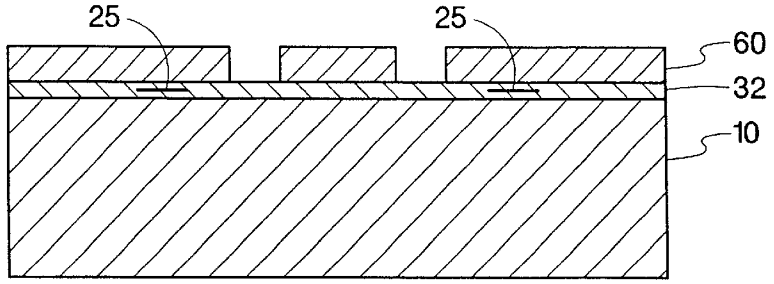
FIGS. 3A–3H are exemplary cross-sectional views of the process steps used to create the improved printhead of the invention.
Figure 3B:
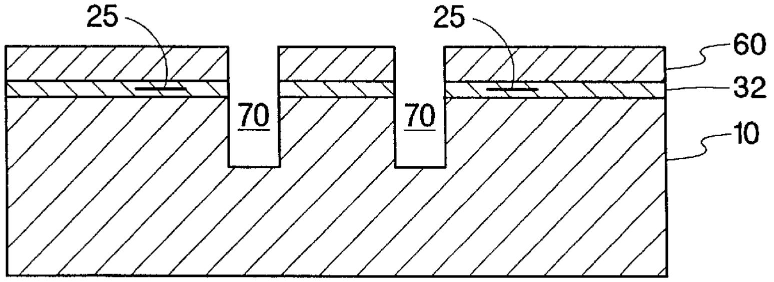
Figure 3C:
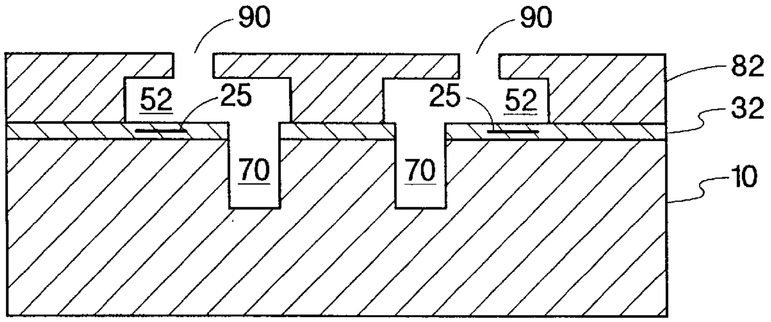
Figure 3D:
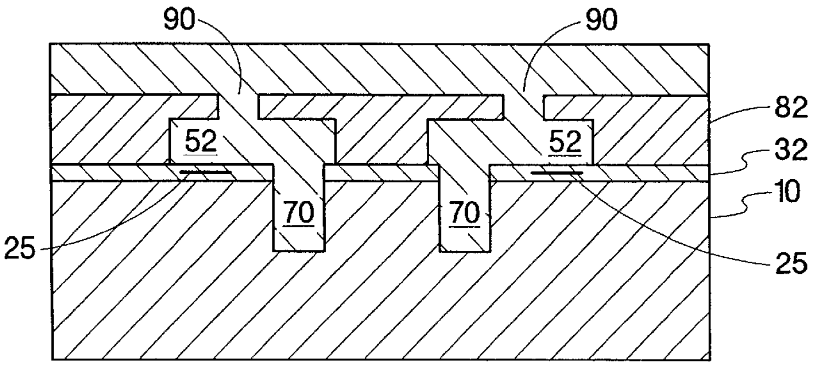
Figure 3E:
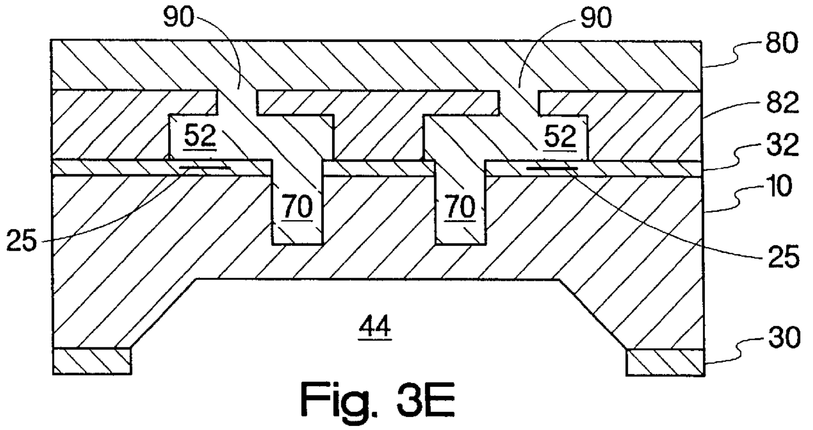
Figure 3F:
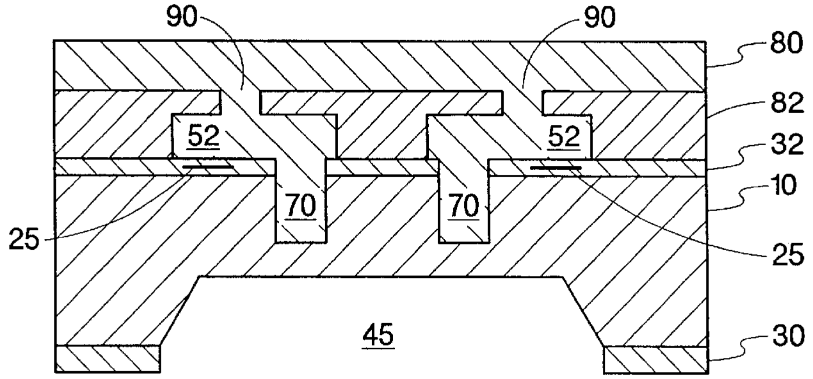
Figure 3G:
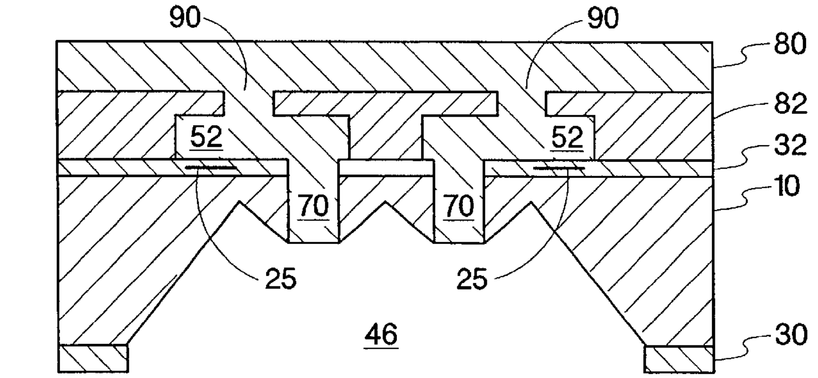
Figure 3H:
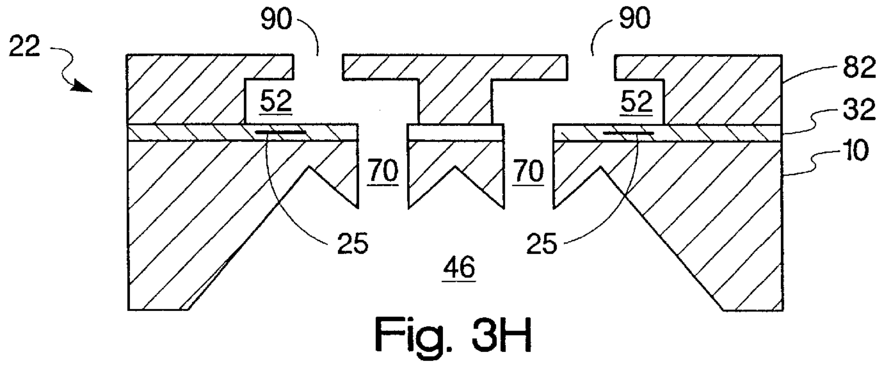
Figure 4:
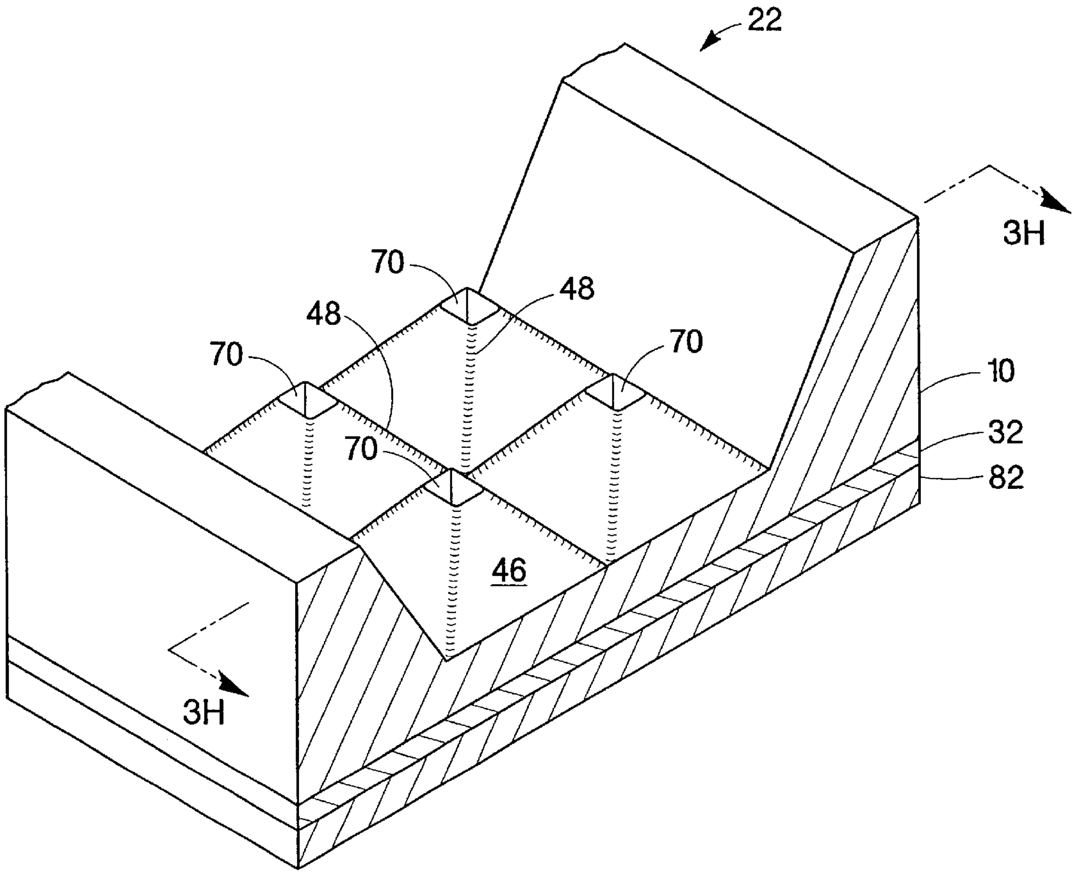
FIG. 4 is a perspective view of the backside of the improved printhead of the invention showing one embodiment in which truncated polyhedron fluid feed channel frustum structures are shown.
Figure 8:
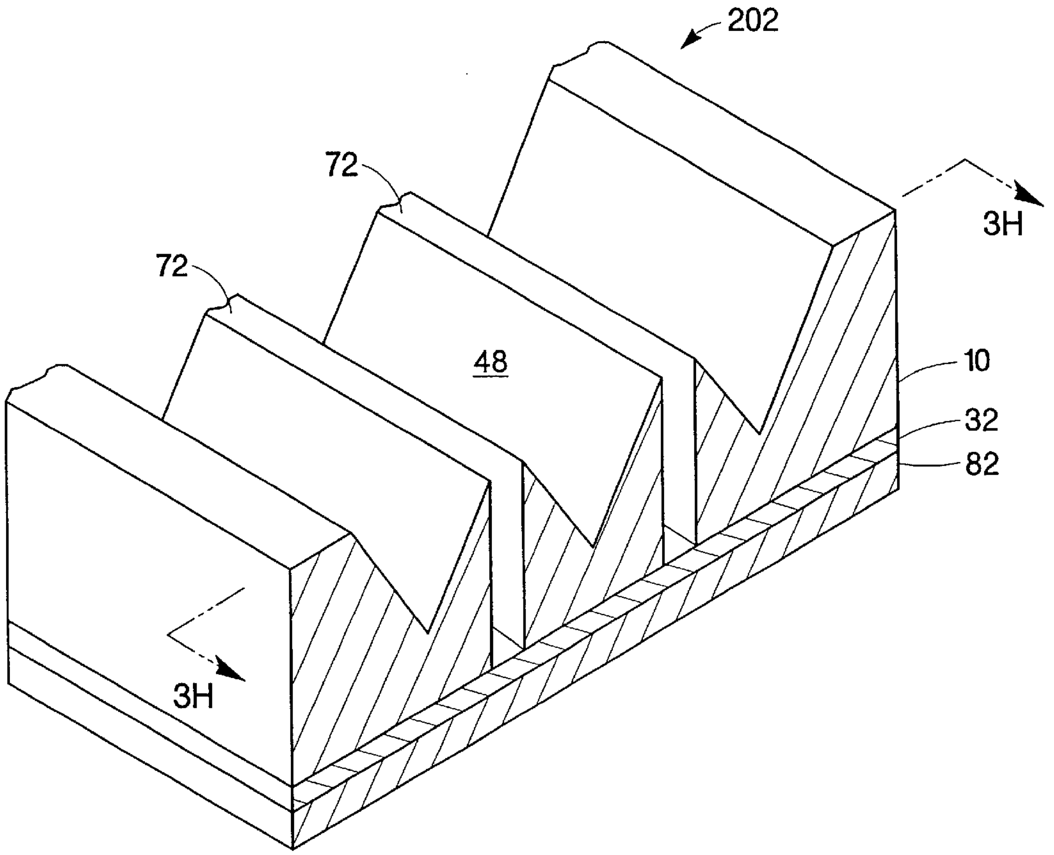
FIG. 8 is a perspective view of the backside of an alternative embodiment of an improved printhead of the invention.

FIG. 2 is an exemplary flow chart and FIGS. 3A–3H are exemplary cross-sectional diagrams along the III—III axis of FIG. 4 or FIG. 8 illustrating the various process steps used to implement the invention. In step 100 and FIG. 3A, a layer of photoresist 60 is applied to the surface of the stack of thin-film layers 32. The photoresist 60 is patterned to define where the fluid feed slots 70 are to be located. In step 110 and FIG. 3B, the fluid feed slots 70 are preferably dry etched a deep distance into the substrate 10, rather than just through the stack of thin-film layers 32 (typically 3–5 microns thick) as done in conventional printhead processing. Preferably, the depth of the etching into substrate 10 is within the range of 20–50 microns but any depth to achieve the desired benefits of the invention is anticipated as coming within the scope and spirit of the invention. After the fluid feed slots 70 are etched, the photoresist 60 is removed.

Additional details of forming thin-film layers may be found in U.S. patent application Ser. No. 09/384,817, entitled "Fully Integrated Thermal Inkjet Printhead Having Thin-film Layer Shelf," filed Aug. 27, 1999, and commonly assigned to the present assignee of this invention.

In optional step 112 and FIG. 3C, an orifice layer 82 is applied on the surface of the stack of thin-film layers 32. Preferably the orifice layer is deposited and formed. The orifice layer 82 is preferably formed of a spun-on epoxy such as photoimagable SU8, developed by IBM and manufactured by several sources. Orifice layer 82 is alternatively laminated or screened on. The orifice layer 82 in one embodiment is preferably 20 microns thick. The fluid chamber 52 and the orifice opening 90 are preferably formed through photolithography. In a preferred technique, a first mask using a half dosage of UV radiation "hardens" the upper surface of the photoimagable SU8 except in locations where the orifice openings 90 are to be formed. A second mask using a full UV dosage then exposes the photoimagable SU8 in those areas where neither orifice opening 90 nor fluid chambers 52 are to be formed. After these two exposures, the photoimagable SU8 is developed, and the hardened portions remain but the orifice openings 90 and the fluid chambers 52 portions of the photoimagable SU8 are removed.

In step 114 and FIG. 3D a front side protection 80 is applied to coat the surface of the processed substrate and preferably to fill the fluid chamber 52 and fluid feed slots 70. Preferably, the front side protection is formed using a polymer material that fills the fluid feed slots 70.

In steps 116, 118, 120 and FIGS. 3E–3H the fluid feed channel 46 is created by preferably etching the backside of substrate 10. In FIG. 3E, the backside of the substrate 10 is masked by backside mask 30, such as a field oxide hard mask or photoresist, to define the fluid channel. A partial fluid channel 44 is etched using a tetramethyl ammonium hydroxide (TMAH) wet etch. Other wet etches such as ethylene diamine pyrocatecol (EDP), potassium hydroxide (KOH) may also be used, but preferably TMAH. The TMAH wet etch forms an angled surface because the TMAH solution etches silicon along the <100> orientation at a far greater rate than <111> orientation, which forms the angled surface. In FIG. 3F, an alternative partial fluid channel creation is shown. Alternative fluid channel 45 is formed using either a laser drill or a sand drill technique known to those skilled in the art. Other dry etch techniques which could be used include $XeF_2$ and $SF_6$. In these alternative fluid channel partial creations, the sidewalls are not as sloped as those formed by the TMAH etch of FIG. 3E. In FIG. 3G, a second etch is performed, preferably with TMAH, but optionally with a laser or sand drill technique to finish etching the fluid channel 46 until the long fluid feed slots 70 containing the frontside protection are reached as in steps 118 and 120. When a TMAH etch is used, the substrate 10 is etched up to the <111> orientation to form the serrated cross sectional profile shown for the fluid channel 46.

Because the fluid channel is not etched all the way to the stack of thin-film layers due to the long fluid feed slots 70, several benefits are achieved. First, a portion of the substrate remains beneath the thin-film layer 32 which provides support to prevent buckling or warping of the thin-film layer 32, thus increasing reliability. Second, the serrated surface provides more surface area for the substrate to contact the fluid in the fluid channel 46, thereby providing better residual heat transfer and ultimately a more consistent bubble nucleation for the ejection element that allows for more precise fluid drop ejection. Third, by using elongated fluid feed slots to stop the etching of the substrate before the thin-film layer 32 is reached, alignment of the fluid channel to the fluid feed slots is not as restrictive as with the conventional manufactured printhead of FIG. 1.

In step 122 and FIG. 3H, the protective frontside protection 80 is removed using preferably a solvent solution reactive to the protective frontside protection material. Optionally, the backside mask is also removed.

Figure 5:
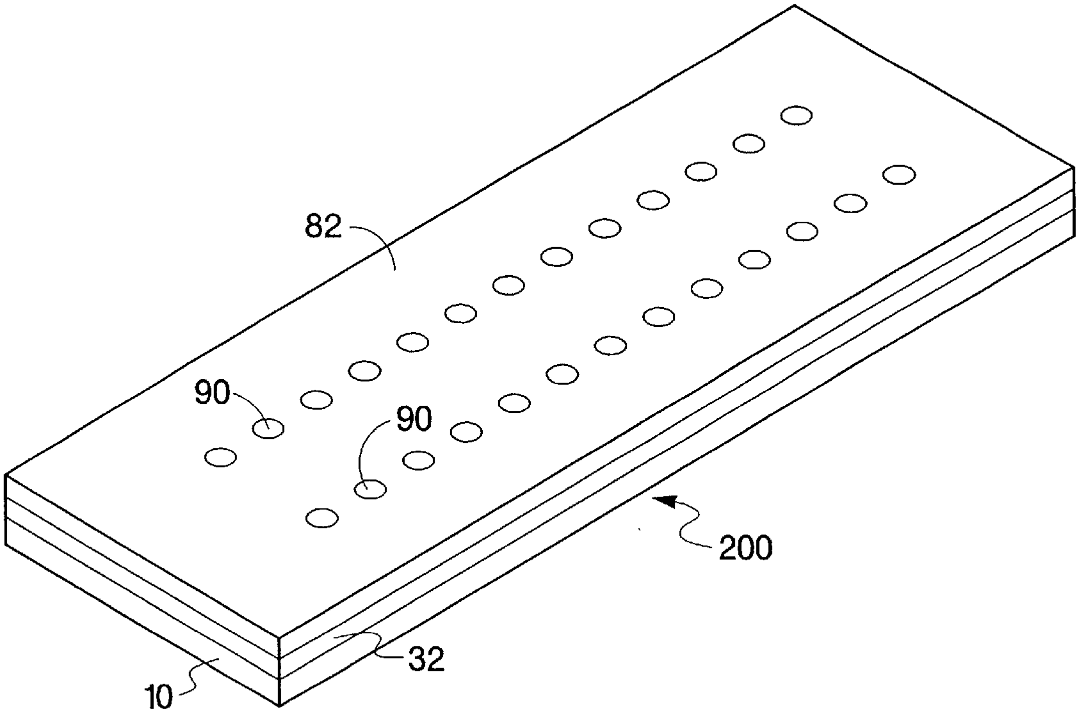
FIG. 5 is an exemplary perspective view of the frontside of the improved printhead of the invention.

After the substrate is processed to form the printheads, the substrate is sawed, or scribed and cut, to form individual printheads such as that shown in FIG. 5. A flexible circuit is used to provide electrical access to the conductors on the printhead. The resulting assembly is then affixed to a plastic print cartridge, such as that shown in FIG. 6.

FIG. 4 is an exemplary perspective view of the backside of the printhead 200 showing the fluid channel 46 of substrate 10. When the fluid feed slots 70 are formed as spaced apart rectangular openings, the surface of the print-head fluid channel 46 is made up of frustums of truncated polyhedrons 48 where the fluid feed slot 70 opening forms the truncated surface. The edges of the truncated polyhedrons may be rounded due to the etching attaching portions of the substrate that are not oriented around the <111> crystalline plane.

FIG. 8 is an exemplary perspective view of the backside of a printhead 202 that has long fluid feed slots 72 that spans more than one fluid chamber. In this embodiment, the surface of the fluid channel forms truncated triangular ridges where the fluid feed slot 72 opening forms the truncated surface. In both FIG. 4 and FIG. 8, the cross sectional view III—III of the printhead forms a serrated fluid channel surface as shown in FIG. 3G.

Figure 9A:
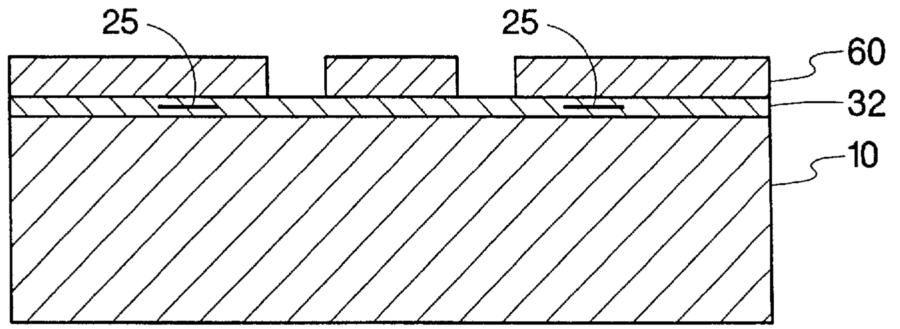
FIGS. 9A–9G are exemplary cross-sectional views of alternative process steps used to create improved printhead of the invention.
Figure 9B:
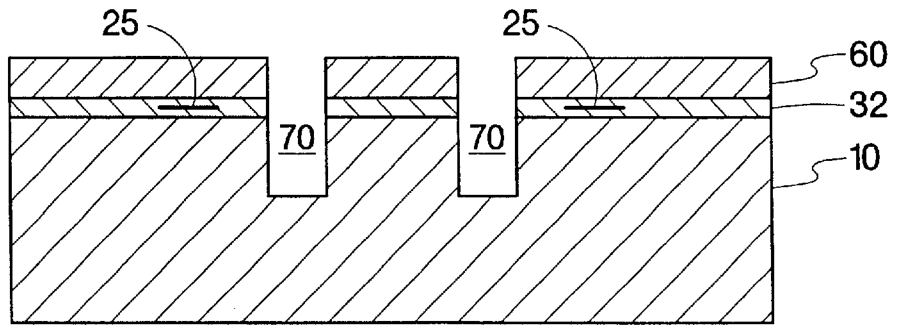
Figure 9C:
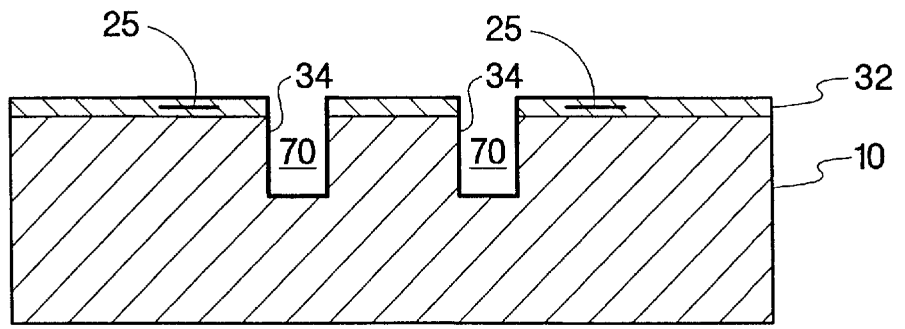
Figure 9D:
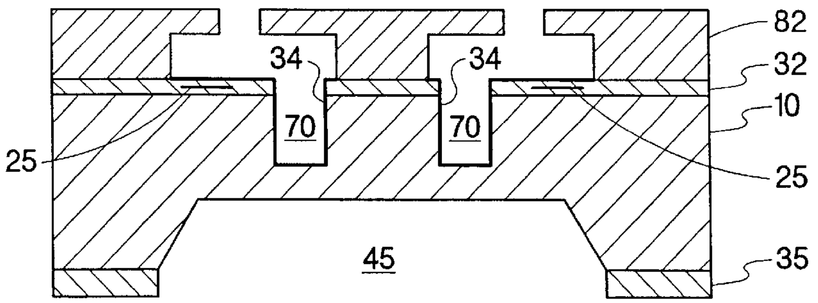
Figure 9E:
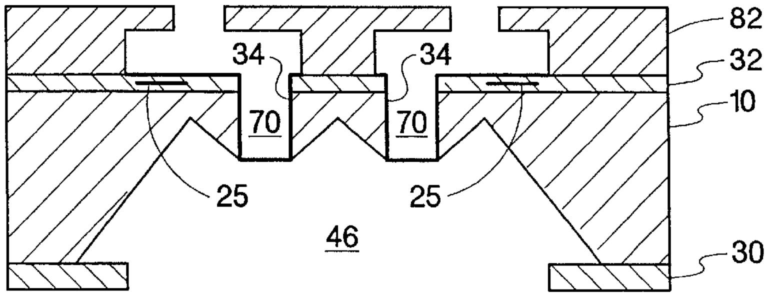
Figure 9F:
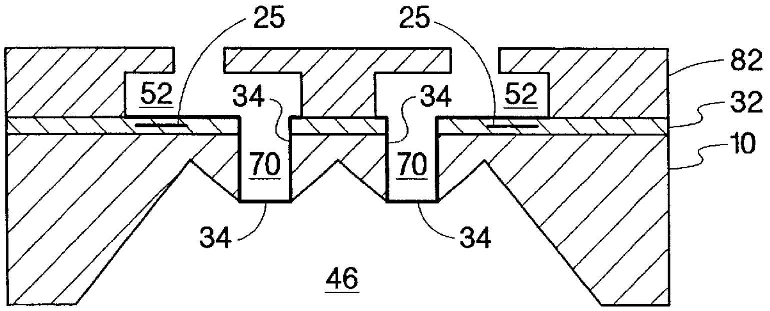
Figure 9G:
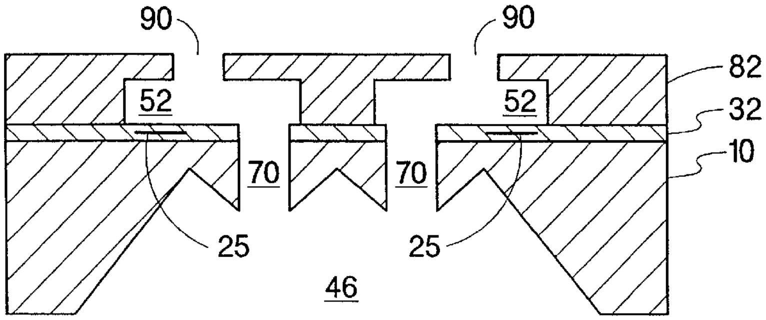

FIG. 2 and FIGS. 9A–9G show alternative processing steps used to create a fluid ejecting device in the form of a printhead incorporating the invention. In step 100 and FIG. 9A, photoresist 60 is applied and patterned to expose an area where the fluid feed slots will be etched. In step 110 and FIG. 9B, the fluid feed slots 70 are etched through the stack of thin-film layers 32 long and deep into the substrate 10. In step 114 and FIG. 9C, the frontside protection is applied as deposited and patterned using conventional photolithographic techniques. Preferably, the protection layer 34 is a plasma TEOS having a thickness of approximately 1000 Angstroms. The thickness of the protection layer 34 should be thin enough to be removed easily with a buffered oxide etch (BOE) but thick enough that it can withstand exposure to the TMAH etchant throughout an approximately 15 hour backside trench etch. The protection layer 34 can be any suitable thin-film material, including oxides, nitrides, carbides, and oxinitrides. In optional step 124, the orifice layer is applied on the stack of thin-film layers 32 after the protection layer 34 has been applied. Preferably the orifice layer 82 is formed of photoimagable SU8, however several other materials and methods of forming an orifice layer are known to those skilled in the art and can be substituted without affecting the scope and spirit of the invention. In steps 116, 118, 120 and in FIGS. 9D and 9E, the fluid feed channel 46 is created. In FIG. 9D a first partial channel 45 is created using preferably a TMAH etch or other wet and dry etches as previously described for FIG. 3E. The first partial channel 45 etch is stopped short of reaching the fluid feed slots 70. A second etch using preferably TMAH is used to etch the substrate along to form surfaces in the fluid feed channel that match the <111> orientation of the preferably silicon substrate. Optionally, a single TMAH etch step can be used to create the fluid feed channel 46. The resulting fluid feed channel 46 structure is shown in FIG. 9E. After this TMAH etch step has been performed, the fluid feed slots have been reached and exposed. In step 122 and FIG. 9F, the frontside protection layer 34 is removed preferably with a BOE etch.

FIG. 5 is a perspective view of an exemplary printhead 200, which implements the invention. Substrate 10 has a stack of thin-film layers 32 disposed on it. Disposed on the stack of thin-film layers is an orifice layer 82 that defines orifice openings 90, commonly called nozzles, used for ejecting fluid from the printhead 200.

Figure 6:
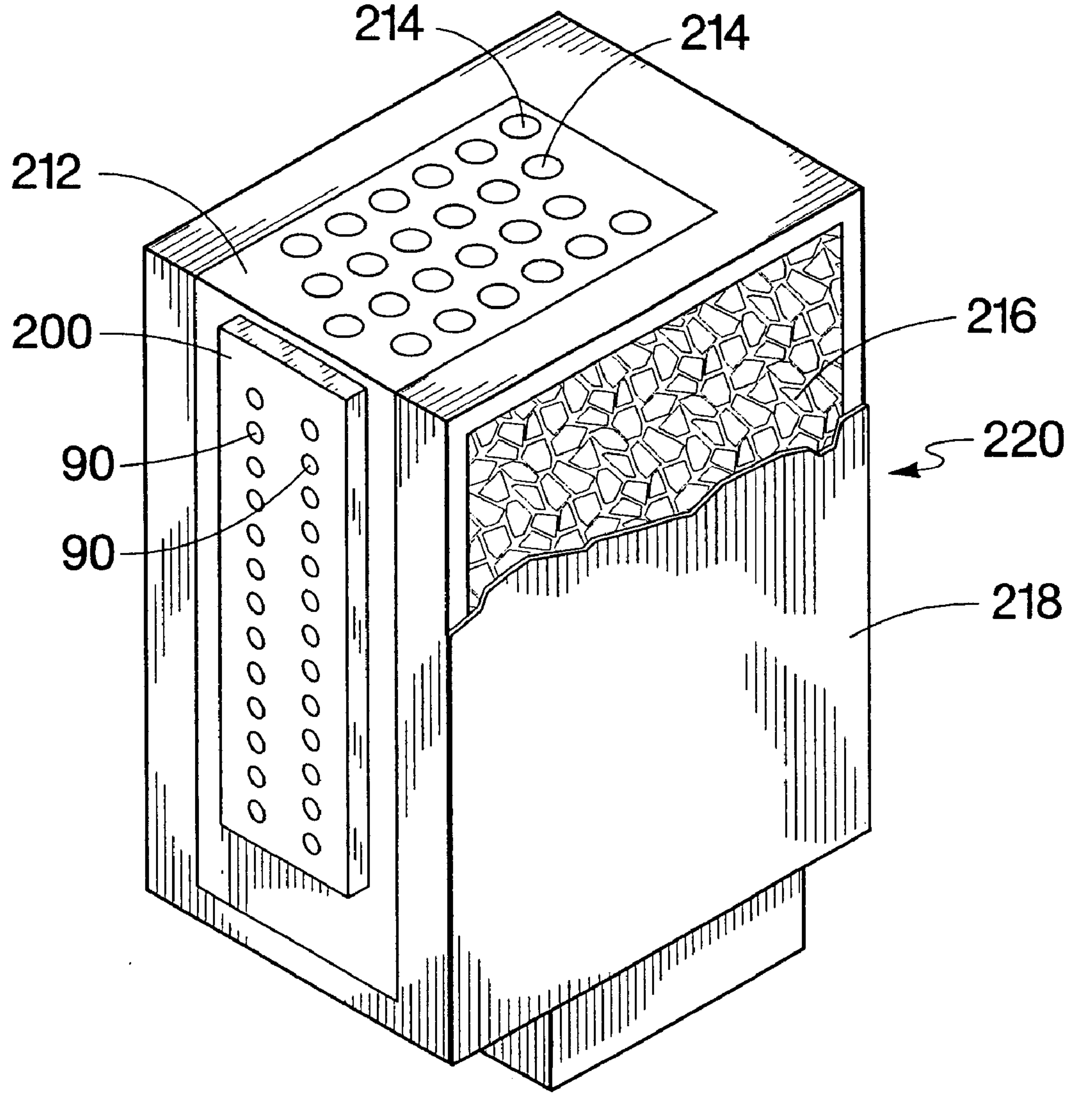
FIG. 6 is an exemplary perspective view of a print cartridge using the improved printhead of the invention.

FIG. 6 is a perspective view of an exemplary fluid ejection cartridge 220, which incorporates the printhead 200 of FIG. 5. Fluid ejection cartridge 220 has a body 218 that is capable of holding fluid and an ink delivery system 216, shown as a closed cell foam sponge, which is used to provide backpressure to prevent fluid from leaking from the orifice openings 90 in printhead 200. Printhead 200 is attached to a flexible circuit 212 to allow for electrical contact to a control device, such as a printer, through the use of contacts 214.

Figure 7:
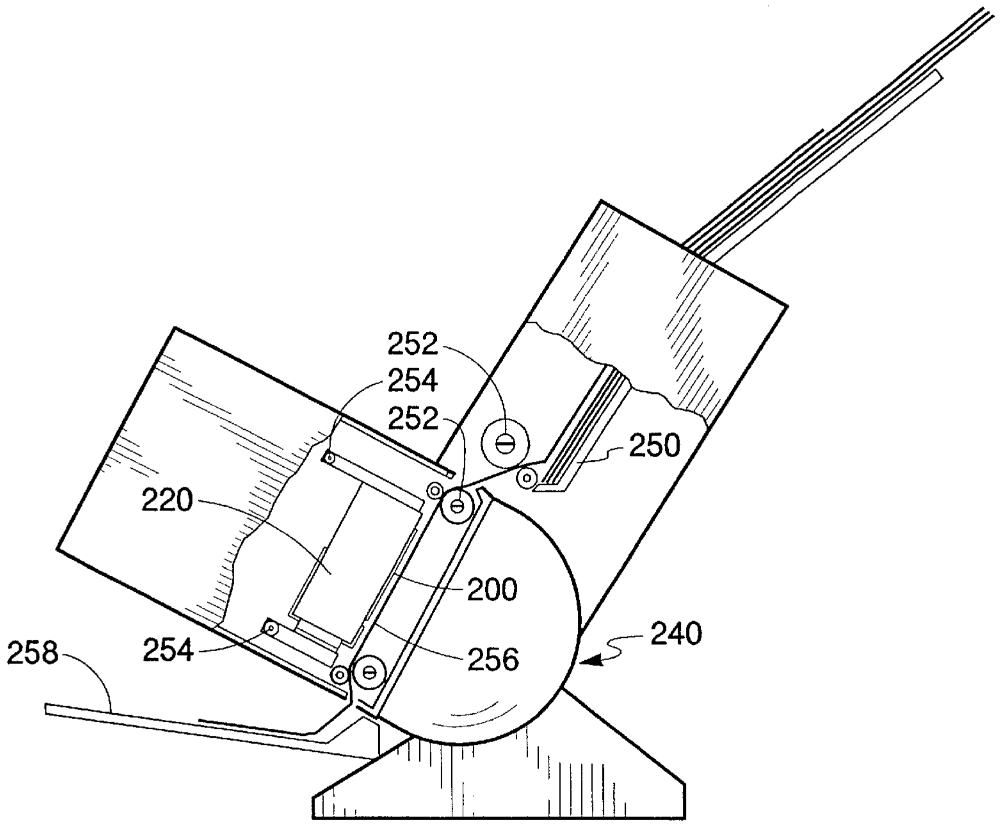
FIG. 7 is a side view of an exemplary printer that uses the exemplary print cartridge of FIG. 6.

FIG. 7 is a side view with a partial cutaway of an exemplary fluid delivery apparatus, a printer 240 that incorporates the exemplary fluid ejection cartridge 220 of FIG. 7. Media 256 is held in media tray 250 and loaded into the printer 240 with transport 252. As the media 256 is transported in a first direction across printhead 200 of fluid ejection cartridge 220, cartridge transport 254 transports the printhead 200 in a second direction across media 256. By such transportation and through the ejection of fluid onto media 256 an image is formed. The media 256 and the resultant printed image are transported to media tray 258 when complete to allow the fluid to dry.

What is claimed is:

1. A method of creating a fluid ejection device from a substrate having a set of thin-film layers disposed on a first surface, the method comprising the steps of:

applying photoresist on the set of thin-film layers, the photoresist defining openings;

etching the set of thin-film layers and substrate in the openings to create deep slots beneath the first surface of the substrate;

thereafter removing the photoresist from the set of thin-film layers;

applying a protection layer over the set of thin-film layers of the substrate and filling the deep slots in the set of thin-film layers and substrate;

creating a feed channel on a second surface of the substrate until the protection layer within the deep slots is exposed; and thereafter removing the protection layer from the thin-film layer and the deep slots.

2. The method of claim 1, further comprising the step of applying an orifice layer on the set of thin-film layers, the orifice layer defining at least one fluid chamber aligned with the deep slots.

3. The method of claim 1, wherein the step of creating the feed channel on the second surface further comprises the step of etching the substrate.

4. The method of claim 1, wherein the step of creating a feed channel on the second surface further comprises the step of sand drilling the feed channel.

5. The method of claim 1, wherein the step of creating a feed channel on the second surface further comprises the step of laser drilling the feed channel.

6. The method of claim 1, wherein the step of applying the protection layer further comprises the step of filling the deep slots with polymer.

7. The method of claim 1, wherein the step of applying the protection layer further comprises the step of depositing a thin film from the group consisting of oxides, nitrides, carbides, and oxinitrides.

* * * * *

UNITED STATES PATENT AND TRADEMARK OFFICE

CERTIFICATE OF CORRECTION

PATENT NO. : 6,718,632 B2
DATED : April 13, 2004
INVENTOR(S) : Liu et al.

It is certified that error appears in the above-identified patent and that said Letters Patent is hereby corrected as shown below:

Column 6,
Lines 53 and 56, delete “a” and insert therefor -- the --.
Lines 55 and 58, delete “feed channel” and insert therefor -- substrate --.

Signed and Sealed this

Thirty-first Day of August, 2004

JON W. DUDAS
*Director of the United States Patent and Trademark Office*